June 21, 1955　　　A. R. LINDSAY　　　2,711,340
AUTOMOBILE BODY UNDERFRAME AND CHASSIS STRUCTURE
Filed May 25, 1951　　　　　　　　　　2 Sheets-Sheet 1
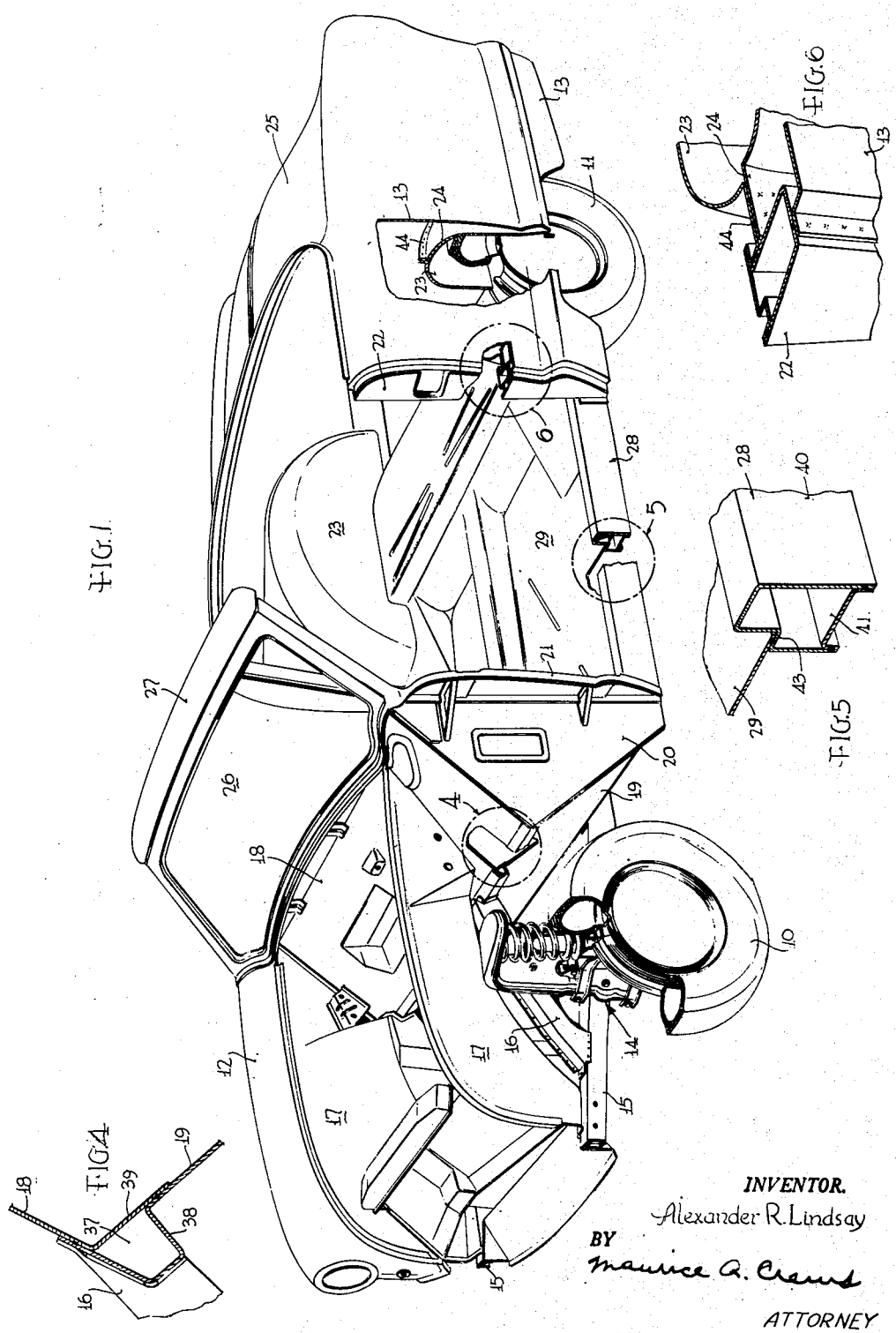
INVENTOR.
Alexander R. Lindsay
BY
ATTORNEY June 21, 1955  A. R. LINDSAY  2,711,340
AUTOMOBILE BODY UNDERFRAME AND CHASSIS STRUCTURE
Filed May 25, 1951  2 Sheets-Sheet 2
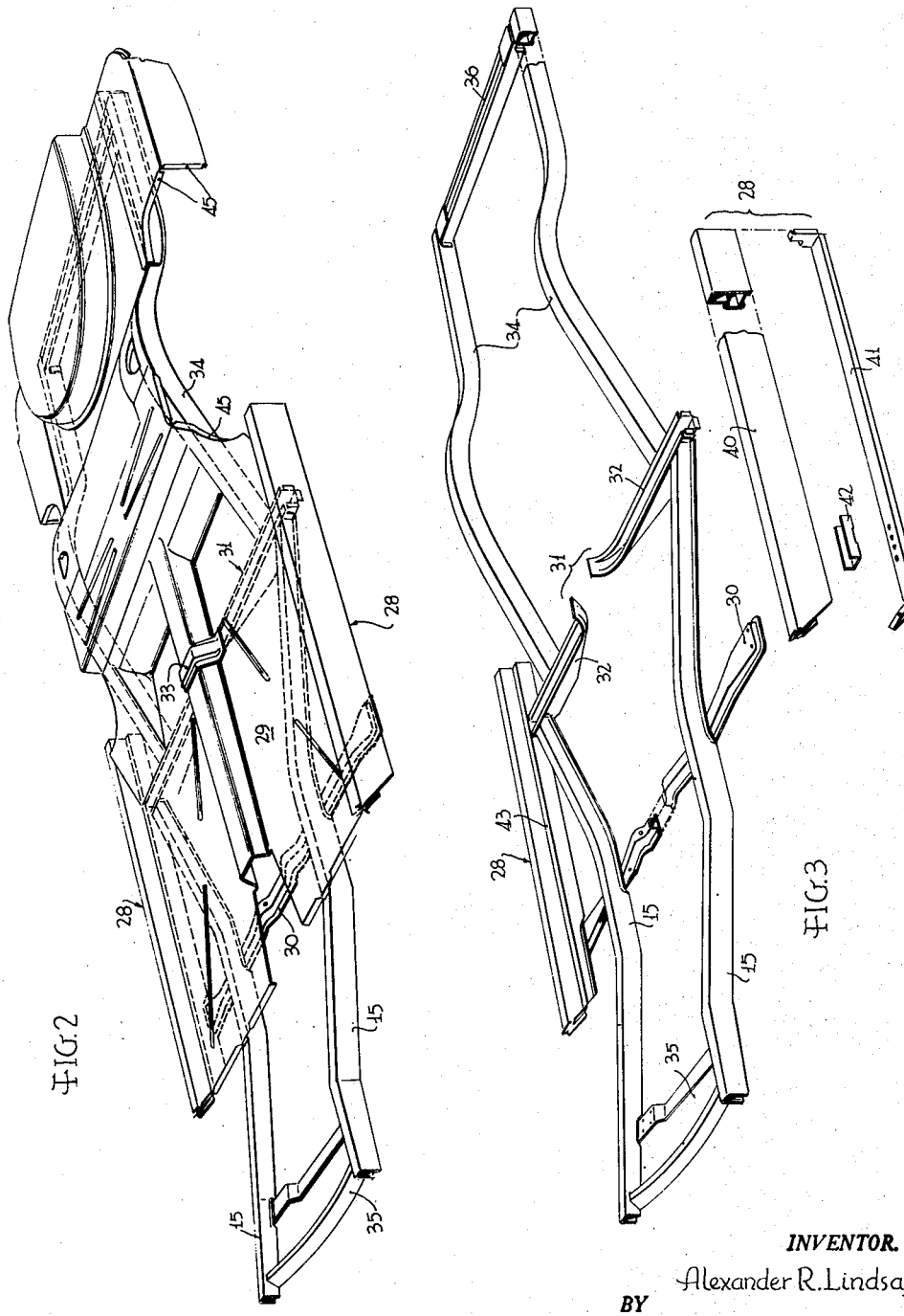
INVENTOR.
Alexander R. Lindsay
BY
Maurice A. Crews
ATTORNEY

United States Patent Office 2,711,340
Patented June 21, 1955

2,711,340

AUTOMOBILE BODY UNDERFRAME AND CHASSIS STRUCTURE

Alexander R. Lindsay, Detroit, Mich., assignor to The Budd Company, Philadelphia, Pa., a corporation of Pennsylvania Application May 25, 1951, Serial No. 228,155

1 Claim. (Cl. 296—28)

The invention relates to a combined body underframe and chassis structure for automobiles.

Among the objects of the invention is a structure of the indicated type which, though light in weight, simple in construction, and easy to manufacture, has great strength and rigidity so as to be usable for automobiles of the open type in which there is no roof supplementing the strength of the underframe. The objects of the invention are mainly achieved by threshold sills, by end sills between one of the pairs of wheels, and by the extension of outer and inner wheel housing stampings toward posts connected with the threshold sills and the extension of the wheel housing stampings.

Further objects and features of the invention will become apparent from the illustration in the attached drawing and from the following description of one embodiment.

In the drawing:

Fig. 1 is a fragmentary three-quarter side and front perspective, partly sectionalized, of an open automobile body;

Fig. 2 is a corresponding perspective of the combined underframe and chassis structure of the automobile shown in Fig. 1;

Fig. 3 is a view, partly sectional and partly exploded, of the underframe structure shown in Fig. 2, but without floor panel;

Fig. 4 is a fragmentary cross section, on a larger scale, through dashboard and toeboard in the region of circle 4 of Fig. 1, but on a larger scale; and Figs. 5 and 6 are fragmentary sectional views, on a larger scale, of the regions in circles 5 and 6 of Fig. 1.

The automobile body structure shown in Fig. 1 is supported by front wheels 10 and rear wheels 11, the wheels being enclosed on the outside by side wall panels or fenders 12, 13, respectively.

The front wheels are secured by means of brackets, levers and springs 14 to front sill members 15 and to upwardly and rearwardly inclined braces 16. Member 15 and brace 16 on each side of the body are connected to panel 17 forming one side wall for a motor compartment and skirt or inner wall of a wheel housing. Brace 16 is an inwardly facing hat-section secured to the outside of panel 17. The rear ends of braces 16 and panels 17 are secured to dashboard 18 and toeboard 19, which in turn are secured to the cowl sides 20 reinforced by front posts 21.

Rear door posts 22 are adjoined by fenders or side panels 13 and inner wheel housing panels 23, 24. Fenders 13 are interconnected by the rear or tonneau panel 25.

Front posts 21 extend upwardly on both sides of the windshield opening 26 and are interconnected by windshield header 27. There are, in the shown embodiment, no side headers and no rigid roof interconnecting the front posts and the tonneau at the top. Consequently, the required strength and rigidity has to be supplied by the bottom structure interconnecting the lower ends of front and rear posts. It is a main object of the invention to achieve a satisfactory solution of this difficult problem with simple, light, and economical means, now to be described.

The front and rear posts 21, 22, on each side of the body, have their lower ends interconnected by a longitudinal threshold sill 28. These sills, one on each side, extend between and end at the inboard sides of the front and rear wheel locations.

The thresholds 28 on opposite sides of the body are interconnected by sheet metal floor panel 29. This panel merges at the front into toeboard 19 and extends at the rear between and around the locations for rear wheels 11.

The thresholds 28 are additionally interconnected by front and rear braces 30, 31. Brace 31 consists of upwardly facing lateral hat-sections 32 secured to the underside and of a downwardly facing central hat-section 33 secured to the top of floor panel 29.

Floor panel 29 is longitudinally reinforced in its rearward region by side sill members 34 which have their forward ends secured to brace 31 at points inwardly spaced from the thresholds 28.

Forward sill members 15 are secured to front brace 30 and are rearwardly extended therebeyond. The members 15 extend laterally outwardly in rear of brace 30 and reach thresholds 28 in front of the rear wheel locations, where they are secured to the thresholds together with cross brace 31.

This disposition of front sills 15, thresholds 28, and brace 31 means that bending stresses are largely transmitted across the location of the door openings between front and rear posts 21, 22 by means of the rearward extensions of front end sills 15 and that thresholds 28 are correspondingly relieved from stress-transmission. Inadmissible movements of the upper ends of the door posts toward and away from each other are consequently avoided.

The front and rear side sills 15, 34 have their ends additionally interconnected by cross braces 35, 36.

In the upper attachment region of the inclined braces 16 a reinforcing box-section cross brace 37 is formed by channel formation 38 along the upper margin of toeboard 19 and by overlapping connection with marginal flange 39 of dashboard 18, as shown in Fig. 4.

Threshold 28 consists of an inverted channel-section 40 and a shallow channel-section 41. The closed box-section, so formed (Fig. 5), is interiorly reinforced by bracket 42 (Fig. 3) in the attachment region for cross brace 30. Floor panel 29 rests on and is secured to an offset 43 of the inner side wall of section 40.

The two members 23, 24 of the rear wheel housing overlap each other along their side front margins at 44, and the overlapping portions or extensions of said members are secured to the respective rear post 22 so as to form a strong brace for the latter, see Fig. 6. The inner wheel housing panel 23 fits into the cut-out in the floor panel and is secured to the marginal flange 45 thereof, Fig. 2.

The invention is not restricted to the details of the illustrated embodiment but is susceptible to modifications without departing from its basic principle. The invention may, for instance, be used in connection with a closed automobile body. Although the main purpose of the invention is to supply the necessary strength where there is no strength-giving roof or side header structure, it is an important advantage that one type of underframe may be used for open as well as closed cars.

What is claimed is:

Combined body underframe and chassis structure for automobiles, comprising an end portion restricted transversely to the space between locations for a pair of road wheels and a mid portion extending transversely beyond the end portion into the space longitudinally inboard of and adjacent said wheel locations, longitudinal threshold sills provided along the side margins of said mid-portion and terminating at said wheel locations, longitudinal sills in said end portion inwardly spaced from said threshold sills and connected to the latter by a cross brace, posts connected with said threshold sills inboard of and adjacent said wheel locations, inner and outer wheel housing stampings secured to the side margins of said end portion and having longitudinal extensions along their inboard sides, said extensions being secured to said posts.

References Cited in the file of this patent

UNITED STATES PATENTS

| | | |
|---|---|---|
| 2,066,019 | Swallow | Dec. 29, 1936 |
| 2,311,880 | Sherman | Feb. 23, 1943 |
| 2,551,528 | Darrin | May 1, 1951 |

FOREIGN PATENTS

| | | |
|---|---|---|
| 662,142 | France | Mar. 18, 1929 |